(12) United States Patent
Barzen et al.

(10) Patent No.: US 8,657,377 B2
(45) Date of Patent: Feb. 25, 2014

(54) SEAT ASSEMBLY WITH EASY ENTRY RELEASE MECHANISM

(75) Inventors: Johannes Barzen, Pfaffenhofen (DE); Eckhard Nock, Schweitenkirchen (DE); Norbert Hertling, Munich (DE); Stefan Schuhmacher, Allershausen (DE)

(73) Assignee: Lear Corporation, Southfield, MI (US)

( * ) Notice: Subject to any disclaimer, the term of this patent is extended or adjusted under 35 U.S.C. 154(b) by 253 days.

(21) Appl. No.: 13/185,803

(22) Filed: Jul. 19, 2011

(65) Prior Publication Data

US 2012/0049599 A1 Mar. 1, 2012

(30) Foreign Application Priority Data

Aug. 30, 2010 (DE) .......................... 10 2010 039 925

(51) Int. Cl.
*B60N 2/00* (2006.01)
*B60N 2/02* (2006.01)

(52) U.S. Cl.
USPC ................. 297/378.1; 297/354.1; 297/354.12

(58) Field of Classification Search
USPC ............. 297/341, 354.1, 354.12, 366, 367 R, 297/367 P, 378.1
See application file for complete search history.

(56) References Cited

U.S. PATENT DOCUMENTS

| | | | |
|---|---|---|---|
| 4,660,886 A | 4/1987 | Terada et al. | |
| 5,522,643 A * | 6/1996 | Matsuura | 297/367 R |
| 5,788,330 A | 8/1998 | Ryan | |
| 6,106,067 A | 8/2000 | Zhuang et al. | |
| 6,161,899 A | 12/2000 | Yu | |
| 6,199,953 B1 | 3/2001 | Chen | |
| 6,513,875 B1 | 2/2003 | Gray et al. | |
| 6,739,668 B2 | 5/2004 | Coman et al. | |
| 6,968,598 B2 | 11/2005 | Becker et al. | |
| 7,014,265 B2 * | 3/2006 | Yamada et al. | 297/367 R |
| 7,021,716 B2 | 4/2006 | Persad et al. | |
| 7,159,945 B2 | 1/2007 | Eppert | |
| 7,195,318 B2 | 3/2007 | Cha et al. | |
| 7,293,838 B2 | 11/2007 | Sugama et al. | |
| 7,328,954 B2 | 2/2008 | Sasaki et al. | |
| 7,503,099 B2 | 3/2009 | Pejathaya | |
| 7,571,962 B2 | 8/2009 | Thiel et al. | |
| 7,648,205 B2 | 1/2010 | Zou et al. | |
| 7,871,128 B2 * | 1/2011 | Bonk et al. | 297/378.12 |
| 2003/0080600 A1 * | 5/2003 | Eppert | 297/367 |
| 2006/0012232 A1 | 1/2006 | Coughlin et al. | |
| 2009/0243362 A1 | 10/2009 | Wieclawski | |
| 2010/0244524 A1 * | 9/2010 | Kumazaki et al. | 297/341 |

FOREIGN PATENT DOCUMENTS

DE 102006001530 A1 7/2007
DE 202008011680 U1 12/2008

* cited by examiner

*Primary Examiner* — Philip Gabler
(74) *Attorney, Agent, or Firm* — Brooks Kushman P.C.

(57) ABSTRACT

A seat assembly for a vehicle includes a recliner assembly having an easy entry mechanism. The easy entry mechanism can be mounted to either an outboard or an inboard side of a seat back frame side member used in seat assemblies for both five-door and three-door vehicle models. The recliner assembly includes an adaptor to couple the easy entry mechanism to a recliner heart disposed on an opposite side of the seat back frame side member.

12 Claims, 4 Drawing Sheets

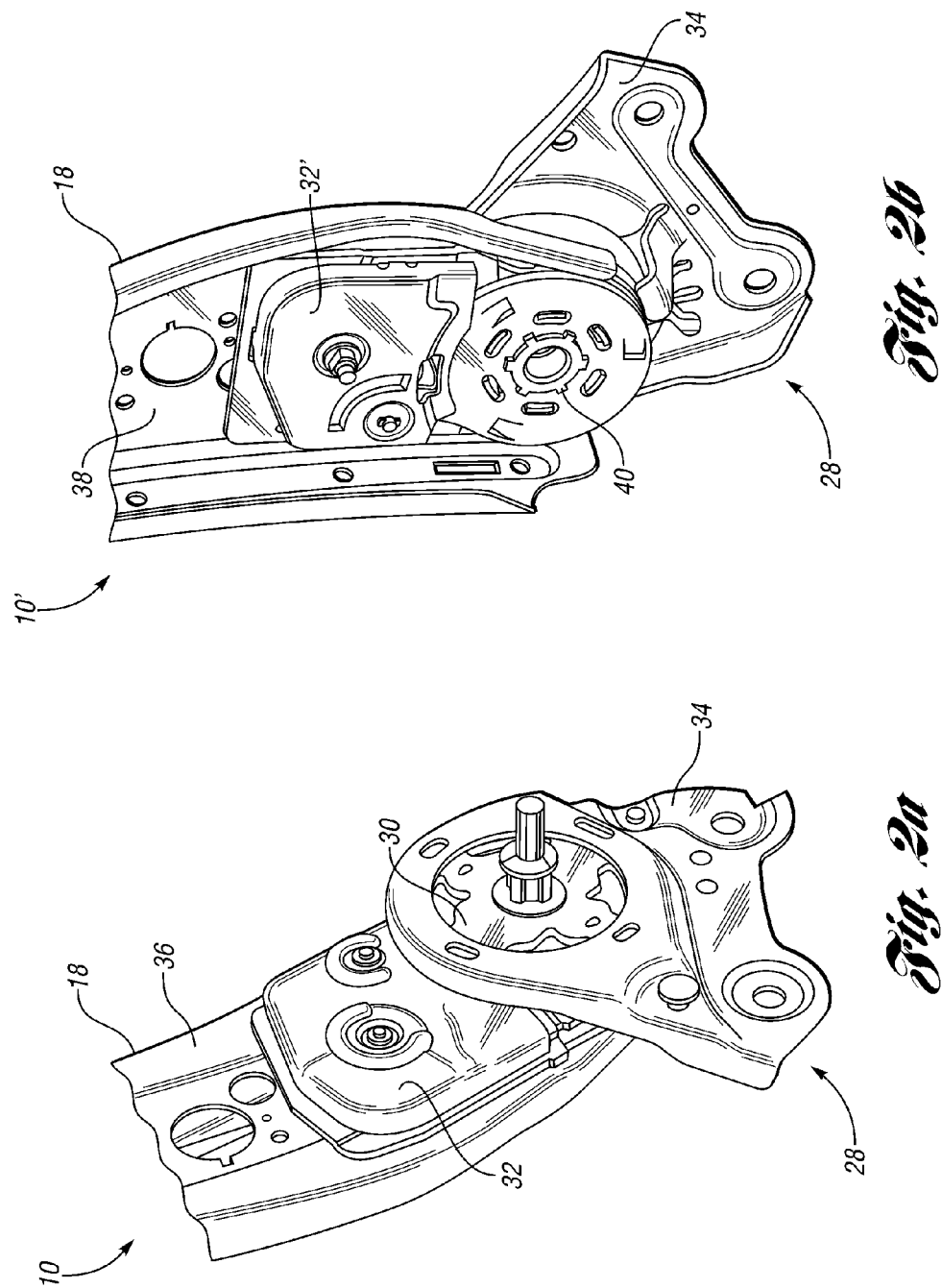

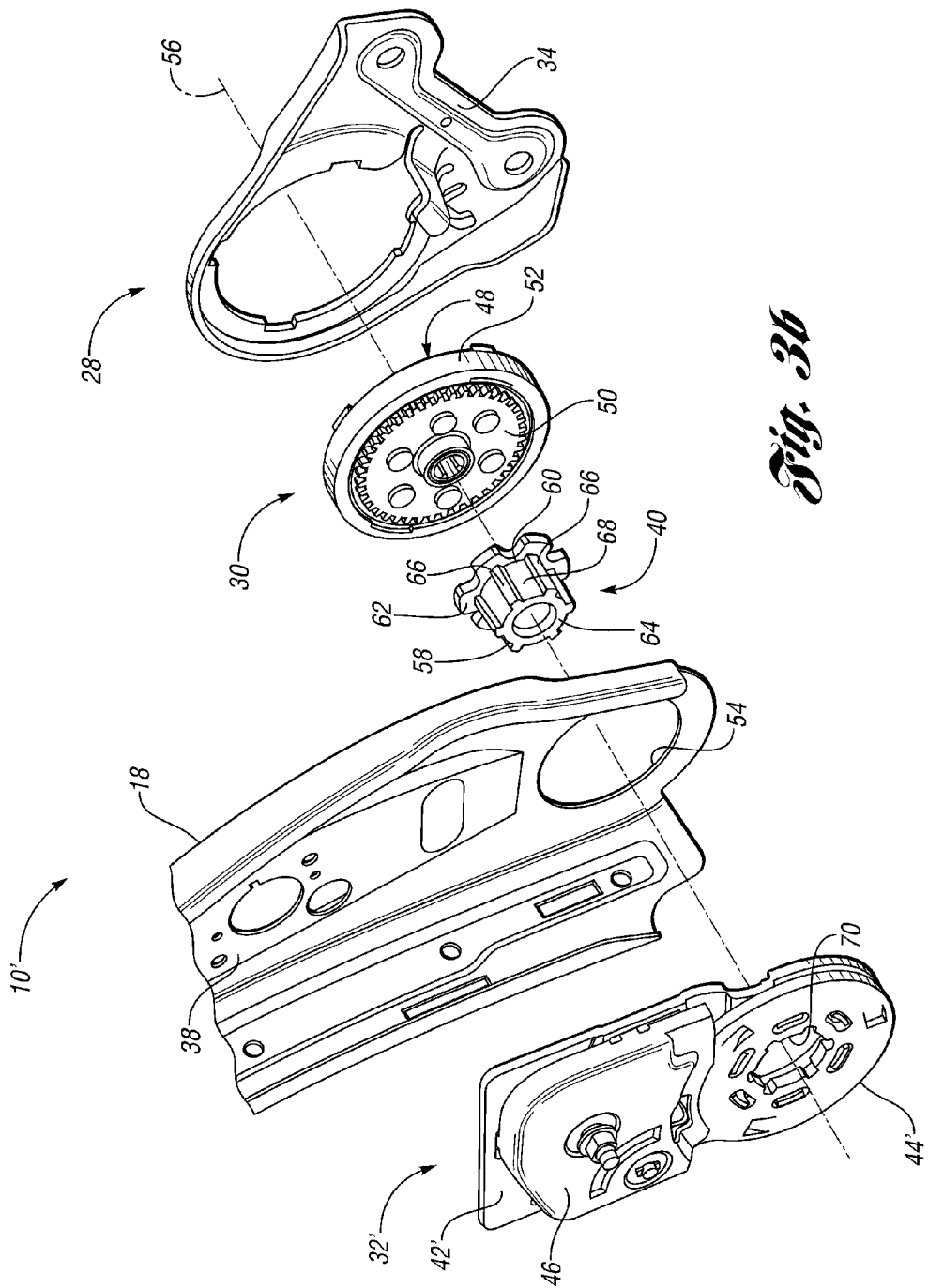

SEAT ASSEMBLY WITH EASY ENTRY RELEASE MECHANISM

CROSS-REFERENCE TO RELATED APPLICATIONS

This application claims foreign priority benefits under 35 U.S.C. §119(a)-(d) to DE 10 2010 039 925.6, filed Aug. 30, 2010, which is hereby incorporated by reference in its entirety.

TECHNICAL FIELD

The following relates to a seat assembly including an easy entry mechanism that can be mounted to either an outboard or an inboard side of a seat back frame side member without affecting the design of the back frame between five-door and three-door vehicle models.

SUMMARY

In at least one embodiment, a seat assembly is provided. The seat assembly may include a seat back frame including a side member having an internal face and an external face. The seat assembly may further include a recliner heart disposed at one of either the internal face or the external face of the side member and an easy entry mechanism fixedly attached to the other of the internal face or the external face of the side member. The easy entry mechanism may be coupled to the recliner heart with an adaptor such that the side member is interposed between the easy entry mechanism and the recliner heart.

In at least one other embodiment, a vehicle seat assembly is provided. The vehicle seat assembly may include a seat bottom frame and a seat back frame. The seat back frame may include a side member having an internal face and an external face. The vehicle seat assembly may further include a recliner assembly mounted to the seat bottom frame and the seat back frame that facilitates pivoting of the seat back with respect to the seat bottom. The recliner assembly may include a recliner heart disposed at one of either the internal face or the external face of the side member. The recliner heart may include a guide plate pivotally coupled to a pivot plate about a pivot axis. The guide plate may be fixedly secured to the seat bottom frame and the pivot plate may be connected to the seat back frame. The recliner assembly may further include an easy entry mechanism fixedly attached to the other of the internal face or the external face of the side member and coupled to the recliner heart such that the side member is interposed between the easy entry mechanism and the recliner heart. The easy entry mechanism may actuate the recliner assembly to a released condition in which the seat back frame is free to pivot toward the seat bottom frame independent of operation of the recliner heart.

In at least one other embodiment, a method of assembling a vehicle seat is provided. The method may include fixedly mounting an easy entry mechanism to one of either an internal face or an external face of a seat back frame side member. The method may further include attaching a recliner heart to a recliner bracket. The recliner heart may include a guide plate pivotally coupled to a pivot plate. The guide plate may be fixedly secured to the recliner bracket. The method may further include fixedly attaching an adaptor to the pivot plate and inserting the adaptor through an aperture in the side member and into a corresponding hole in the easy entry mechanism such that the recliner heart is disposed adjacent the other of the internal face or the external face of the side member. The method may also include fixedly securing the adaptor to at least a portion of the easy entry mechanism such that the side member is interposed between the easy entry mechanism and the recliner heart.

BRIEF DESCRIPTION OF THE DRAWINGS

FIG. 2a is a fragmentary perspective view of a portion of the seat assembly according to one or more embodiments of the present application;

FIG. 2b is a fragmentary perspective view of a portion of an alternate seat assembly according to one or more embodiments of the present application;

FIG. 3a is an exploded perspective view of the portion of the seat assembly depicted in FIG. 2a; and FIG. 3b is an exploded perspective view of the portion of the alternate seat assembly depicted in FIG. 2b.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
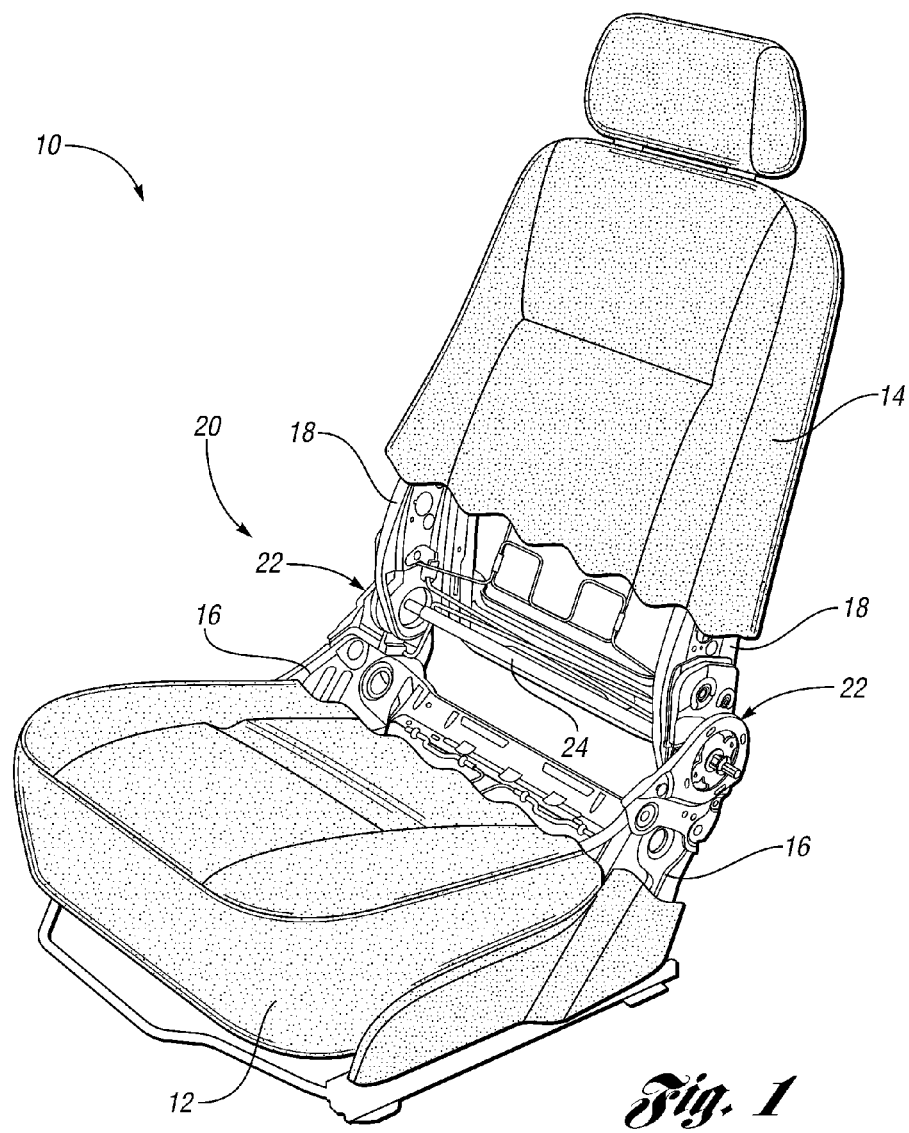
FIG. 1 is a perspective view of a seat assembly according to one or more embodiments of the present application.

Referring to FIG. 1, an exemplary seat assembly 10 is shown. The seat assembly 10 may be configured for use in a vehicle, such as a motor vehicle like a car or truck. The seat assembly 10 may include a seat bottom 12 and a seat back 14. The seat bottom 12 may be configured to be mounted on a support surface, such as a floor pan of a vehicle. At least one track assembly may be coupled to the seat bottom 12 to facilitate fore and aft positioning of the seat assembly 10. The seat back 14 may be pivotally disposed on the seat bottom 12 as will be described in more detail below. In FIG. 1, the seat back 14 is shown in an upright or seating position.

The seat bottom 12 and seat back 14 may each include structural frames that may have any suitable configuration. In at least one embodiment, the seat bottom frame may include side members 16 disposed opposite each other and one or more cross members (not shown) that extend between the side members. Similarly, the seat back frame may include side members 18 disposed opposite each other and one or more cross members (not shown) that extend between the side members.

A recliner assembly 20 may pivotally connect the seat back 14 to the seat bottom 12. The angle of inclination (i.e., tilt) of the seat back 14 may be adjusted in response to user input. The recliner assembly 20 may include a pair of recliner mechanisms 22 operatively coupled to one another via a torque rod 24. The recliner mechanisms 22 may have similar configurations. For instance, the recliner mechanisms 22 may generally be mirror images of each other. The recliner assembly 20 may be either manually or electrically driven as is known to those of ordinary skill in the art. The torque rod 24 may interconnect the recliner mechanisms 22 to synchronize their operation.

Referring to FIGS. 2a-b, some components of the seat assembly 10 are shown in more detail. In particular, FIGS. 2a-b illustrate exemplary embodiments of a left-hand recliner mechanism 22 affixed to a seat back frame left-hand side member 18. The recliner mechanism 22 may include an upper mounting bracket assembly 26, a lower mounting bracket assembly 28, a recliner heart 30, and an easy entry mechanism 32. According to one or more embodiments, the easy entry mechanism 32 may include a memory module.

The lower mounting bracket assembly 28 may be disposed on the seat bottom frame in any suitable manner. For example, the lower mounting bracket assembly 28 may include a recliner bracket 34 fixedly attached to the seat bottom frame side member 16 (see FIG. 1) using fasteners, welding, or the like.

The recliner heart 30 may be disposed on or received by the lower mounting bracket assembly 28. The recliner heart 30 may be configured to control pivotal movement of the seat back 14 in a manner known by those skilled in the art.

The upper mounting bracket assembly 26 may be disposed on the seat back frame in any suitable manner. For instance, the upper mounting bracket assembly 26 may be fixedly attached to the seat back frame side member 18 using fasteners, welding, or the like.

According to one or more embodiments of the present application, the easy entry mechanism 32 may be disposed on the upper mounting bracket assembly 26. Alternatively, the easy entry mechanism 32 may replace the upper mounting bracket assembly altogether. To this end, the easy entry mechanism 32 may be directly mounted to the seat back frame side member 18 without the aid of an upper mounting bracket assembly.

The easy entry mechanism 32 may cooperate with the recliner heart 30 to facilitate actuation of the seat back 14 with respect to the seat bottom 12. Moreover, the easy entry mechanism 32 may disengage from the recliner heart 30 when the seat back 14 is released by an easy entry release system (not shown) that allows the seat back 14 to be "dumped" or made free to pivot forward or over the seat bottom 12.

As used herein, the term "easy entry function" may refer to the ability of a seat assembly or components thereof to move when actuated so as to allow a user greater clearance/access to an area located rearward of the seat assembly. A user may remotely trigger the easy entry mechanism 32 using the easy entry release system to permit the seat back 14 to pivot in a forward direction past a normal operating position to allow the user to enter or otherwise access an area disposed rearward of the seat assembly 10. In general, easy entry release mechanisms may be utilized on forward seat assemblies to gain access to rear seats/compartments in vehicles with a limited number of doors, such as in two-door coupes (i.e., three-door vehicles).

After the easy entry function has been actuated, the memory module may allow the seat back 14 to return to substantially the same angular orientation with respect to the seat bottom 12 that the seat back 14 occupied immediately prior to actuation of the easy entry function. Thus, a user may avoid the need to readjust the seat back 14 each time the easy entry function is triggered.

With specific reference to FIG. 2a, the easy entry mechanism 32 may be fixedly mounted to an external face 36 of the side member 18. As such, the easy entry mechanism 32 may be interposed between the side member 18 and the combination of the recliner heart 30 and lower mounting bracket assembly 28.

With specific reference to FIG. 2b, an easy entry mechanism 32' may alternatively be fixedly mounted to an internal face 38 of the side member 18. As such, the side member 18 may be interposed between the easy entry mechanism 32' and the combination of the recliner heart 30 and lower mounting bracket assembly 28. Moreover, an adaptor 40 may be employed to couple the easy entry mechanism 32' to the recliner heart 30.

Both the easy entry mechanisms 32, 32' and the side member 18 may be configured such that the side member 18 can receive the easy entry mechanisms 32, 32' on either its external face 36 or its internal face 38. Moreover, the easy entry mechanism 32' may be configured to mount on the internal face 38 of the side member 18 without affecting the design of the back frame between five-door and three-door vehicles, for example. Thus, seat back frame side members 18 may be carried over from a five-door vehicle program that does not require an easy entry mechanism to a three-door vehicle program that may require an easy entry mechanism.

While FIGS. 2a-b depict only a left-hand-side recliner mechanism disposed on a left side member of the seat back frame, a right-hand-side recliner mechanism may be similarly configured and can be disposed on a right side member in a similar fashion. Moreover, the easy entry mechanism 32 typically mounted on the external face 36 of the left side member 18 (shown in FIG. 2a) may be mounted on the internal face of the right side member (not shown). Likewise, the easy entry mechanism 32' typically mounted on the external face of the right side member (not shown) may be mounted on the internal face 38 of the left side member 18 (FIG. 2b). This may be due to the reverse orientation of an easy entry mechanism when mounted on an internal face 38 of a side member 18 as opposed to the external face 36 of the same side member. Thus, the easy entry mechanism 32' shown in FIG. 2b may generally be the mirror image of the easy entry mechanism 32 shown in FIG. 2a.

Figure 3A:
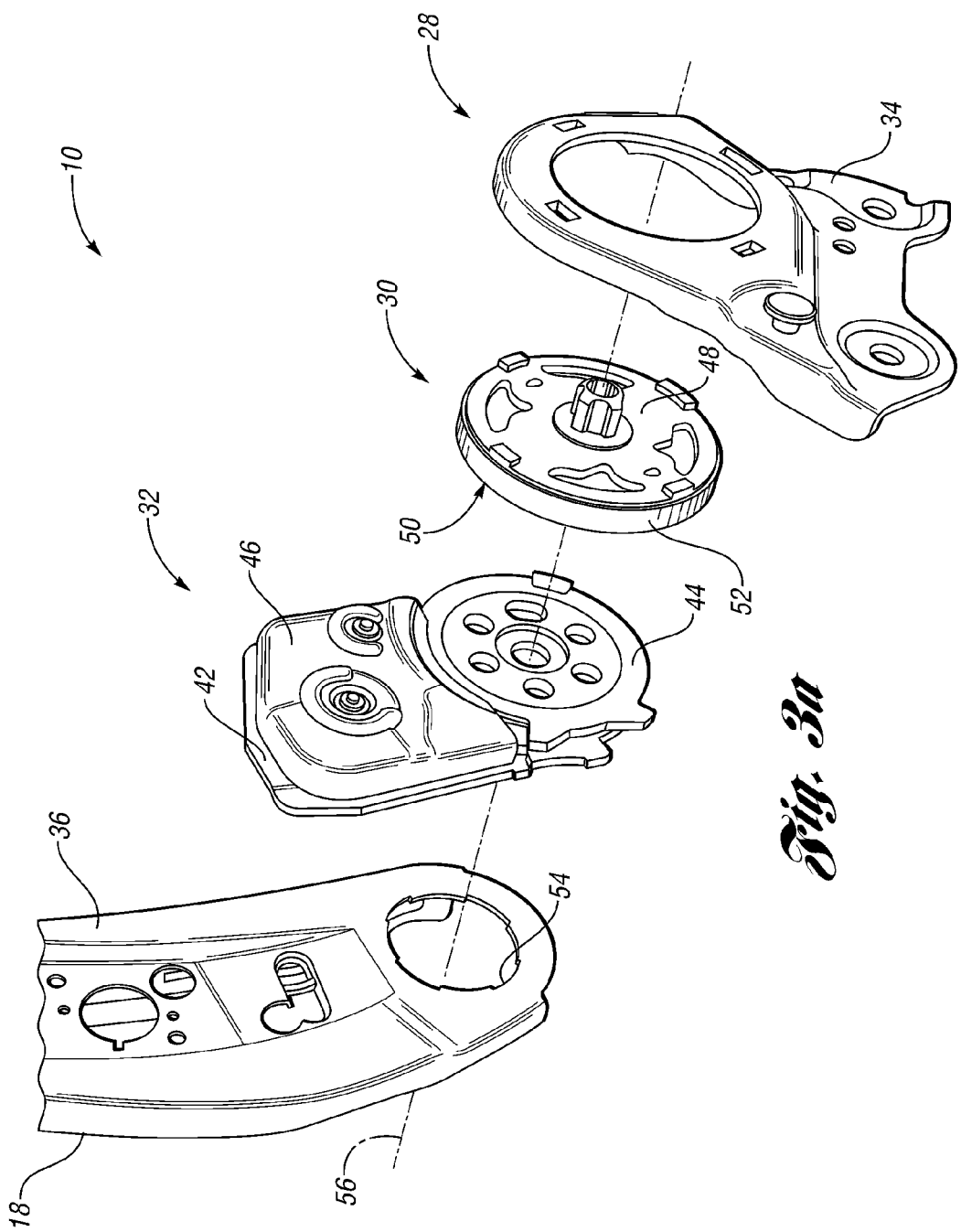

Referring now to FIG. 3a, an exploded perspective view of the portion of the seat assembly 10 shown in FIG. 2a is illustrated. As seen therein, the easy entry mechanism 32 can be disposed between the side member 18 and the recliner heart 30. According to one or more embodiments of the present application, the easy entry mechanism 32 may include a back plate 42 that is fixedly attached to the external face 36 of the side member 18 using fasteners, welding, or the like. The easy entry mechanism 32 may further include a memory plate 44 pivotally coupled to the back plate 42 by a bearing ring (not shown). The memory plate 44 may be locked with respect to the back plate 42 in a locked state by way of a locking mechanism (not shown), and may freely pivot with respect to the back plate 42 in an unlocked state. As shown, the easy entry mechanism 32 may further include a cover plate 46 encasing the locking mechanism.

The recliner heart 30 may include a guide plate 48 and a pivot plate 50 (best shown in FIG. 3b) held together by a clamping ring 52. The guide plate 48 and the pivot plate 50 may be configured to rotate relative to each other to control pivotal movement of the seat back 14 with respect to the seat bottom 12 during tilt adjustment. To this end, the guide plate 48 may be fixedly attached to the lower mounting bracket assembly 28 and the pivot plate 50 may be fixedly attached to the memory plate 44. Accordingly, the inclination angle of the seat back 14 during a locked state of the easy entry mechanism 32 may be maintained after the seat back 14 is returned from the forward, "dumped" position during an unlocked state of the easy entry mechanism. The guide plate 48 may be affixed to the lower mounting bracket assembly 28 using any suitable method known to one of ordinary skill, such as welding, staking, or the like. Likewise, the pivot plate 50 may be fixedly attached to the memory plate 44, directly or indirectly, in a similar fashion.

The side member 18 may include an aperture 54 axially aligned with a pivot axis 56 of the recliner heart 30 and the easy entry mechanism 32. The torque rod 24 may be connected to the recliner mechanism 22 through the aperture 54, as shown in FIG. 1.

With reference to FIG. 3b, an exploded perspective view of the portion of a seat assembly 10' shown in FIG. 2b is illustrated. As seen therein, the side member 18 can be disposed between the easy entry mechanism 32' and the recliner heart 30. The back plate 42' of the easy entry mechanism 32' may be fixedly attached to the internal face 38 of the side member 18. Like the embodiments shown in FIGS. 2a and 2b, the recliner heart 30 may be secured to the lower mounting bracket assembly 28 at the guide plate 48. Unlike those embodiments, however, the adaptor 40 may fixedly connect the pivot plate 50 of the recliner heart 30 to the memory plate 44' of the easy entry mechanism 32'.

In this regard, the adaptor 40 may include a first end 58 and a second end 60. Moreover, the adaptor 40 may include a base 62 disposed at the second end 60 and an axially-extending spacer 64. The spacer 64 may be cylindrical, as shown by example in FIG. 3b. Alternatively, the spacer 64 may have a square or some other cross-sectional shape. Additionally, the spacer 64 may include one or more splines 66 extending axially along an outer surface 68. It should be noted that the adaptor shown in FIGS. 2b and 3b is exemplary only, and an adaptor having alternate forms that can fixedly connect the pivot plate 50 to the memory plate 44' is fully contemplated.

The adaptor 40 may be affixed to the pivot plate 50 at its second end 60, passed through the aperture 54 in the side member 18 and a bearing hole (not shown) in the back plate 42', and then inserted into a corresponding hole 70 in the memory plate 44' that is keyed to match the splined outer surface 68. Once inserted into the keyed hole 70, the adaptor 40 may be fixedly attached to the memory plate 44' by welding, staking, or the like.

In order for the easy entry mechanism to properly disengage from the recliner heart 30 when the seat back 14 is released by the easy entry release system, thereby allowing the seat back 14 to be "dumped" or made free to pivot forward over the seat bottom 12, the easy entry mechanism 32' shown in FIG. 3b may generally be configured as the mirror image of the easy entry mechanism 32 described in the embodiment shown in FIG. 3a.

The design of the easy entry mechanism varies slightly in the figures from one embodiment to another, particularly with respect to the memory plate. However, it should be noted that an easy entry mechanism having the same, universal design that can be mounted both inboard and outboard of the side member 18 may also be employed. To this end, an outside right-hand easy entry mechanism may also be used as an inside left-hand easy entry mechanism. Similarly, an outside left-hand easy entry mechanism may also be used as an inside right-hand easy entry mechanism.

By mounting the easy entry mechanism 32' on the internal face 38 of the side member 18, additional space is created to the outside of the side member. The additional space may allow for more packaging room, for example, for a side airbag. Moreover, the additional space may provide additional room for the hand of a user (e.g., when accessing a recliner handle, turning wheel, or other seat controls). Additionally, due to the inboard mounting location of the easy entry mechanism, less trim and cover components may be required.

Additionally, according to one or more embodiments of the present application, the easy entry mechanism 32' may not require a different or modified seat back frame side member 18 in order to be mounted inboard versus outboard. Thus, the same seat back frame side member 18 may be carried over from other similar vehicle programs that do not require an easy entry mechanism to facilitate ingress and egress to an area disposed behind the seat assembly 10'.

Although the easy entry mechanism 32' is exemplified in FIGS. 2b and 3b as mounted inside the back frame side member 18 with the recliner heart 30 disposed to the outside, an easy entry mechanism may alternatively be mounted to the outside of the side member 18 while a recliner heart is disposed to the inside (not shown). Thus, according to one or more embodiments of the present application, the side member 18 may also be interposed between an easy entry mechanism mounted to the external face 36 and a recliner heart disposed at the internal face 38. In this regard, the adaptor 40 may be similarly employed to couple the recliner heart to the easy entry mechanism.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back frame including at least one side member having an internal face and an external face;
   a recliner heart disposed at one of either the internal face or the external face of the at least one side member, the recliner heart including a guide plate pivotally coupled to a pivot plate about a pivot axis;
   an easy entry mechanism fixedly attached to the other of the internal face or the external face, the easy entry mechanism including a memory plate pivotally coupled to a back plate about the pivot axis, the memory plate being locked with respect to the back plate in a locked state and free to pivot with respect to the back plate in an unlocked state; and
   an adaptor having a first end and a second end separated by an axially-extending spacer, the adaptor coupling the recliner heart to the easy entry mechanism through the side member interposed therebetween;
   wherein the back plate is fixedly mounted to one of either the internal face or the external face of the side member and the memory plate is fixedly secured to the first end of the adaptor, and
   wherein the guide plate is fixedly secured to a seat bottom and the pivot plate is fixedly secured to the second end of the adaptor.

2. The seat assembly of claim 1, wherein the spacer is cylindrically-shaped and includes at least one spline extending axially along an outer surface.

3. The seat assembly of claim 2, wherein the first end of the adaptor is inserted through an aperture in the side member and into a corresponding hole in the memory plate to at least partially secure the memory plate to the pivot plate.

4. The seat assembly of claim 1, wherein the recliner heart is disposed at the external face of the side member and the easy entry mechanism is fixedly attached to the internal face of the side member.

5. A vehicle seat assembly comprising:
   a seat bottom frame;
   a seat back frame including a side member having an internal face and an external face; and
   a recliner assembly mounted to the seat bottom frame and the seat back frame that facilitates pivoting of the seat back with respect to the seat bottom, the recliner assembly including:

a recliner heart disposed at one of either the internal face or the external face of the side member, the recliner heart including a guide plate pivotally coupled to a pivot plate about a pivot axis, the guide plate being fixedly secured to the seat bottom frame and the pivot plate being connected to the seat back frame, an easy entry mechanism fixedly attached to the other of the internal face or the external face of the side member and coupled to the recliner heart such that the side member is interposed between the easy entry mechanism and the recliner heart, the easy entry mechanism configured to actuate the recliner assembly to a released condition in which the seat back frame is free to pivot toward the seat bottom frame independent of operation of the recliner heart, and an adaptor having a first end and a second end separated by a spacer, the adaptor connecting the recliner heart to the easy entry mechanism through an aperture in the side member.

6. The seat assembly of claim 5, wherein the easy entry mechanism includes a memory plate pivotally coupled to a back plate about the pivot axis, the memory plate being locked with respect to the back plate in a locked state and free to pivot with respect to the back plate in an unlocked state.

7. The seat assembly of claim 6, wherein the back plate is fixedly mounted to one of either the internal face or the external face of the side member and the memory plate is fixedly secured to the first end of the adaptor.

8. The seat assembly of claim 7, wherein the pivot plate is fixedly secured to the second end of the adaptor.

9. The seat assembly of claim 8, wherein the spacer is tubular-shaped and includes at least one spline extending axially along an outer surface.

10. The seat assembly of claim 9, wherein the first end of the adaptor is inserted into a corresponding hole in the memory plate to at least partially secure the memory plate to the pivot plate.

11. A method of assembling a seat comprising:

fixedly mounting an easy entry mechanism to one of either an internal face or an external face of a seat back frame side member, the easy entry mechanism including a memory plate pivotally coupled to a back plate about a pivot axis, the memory plate being locked with respect to the back plate in a locked state and free to pivot with respect to the back plate in an unlocked state, wherein the back plate is fixedly secured to one of either the internal face or the external face of the side member;

attaching a recliner heart to a recliner bracket, the recliner heart including a guide plate pivotally coupled to a pivot plate, the guide plate being fixedly secured to the recliner bracket;

fixedly attaching a first end of an axially-extending adaptor to the pivot plate;

inserting the adaptor through an aperture in the side member and into a corresponding hole in the easy entry mechanism such that the recliner heart is disposed adjacent the other of the internal face or the external face of the side member; and fixedly securing a second end of the adaptor to the memory plate of the easy entry mechanism such that the side member is interposed between the easy entry mechanism and the recliner heart.

12. The method of claim 11, wherein the step of fixedly mounting an easy entry mechanism to one of either an internal face or an external face includes fixedly mounting the easy entry mechanism to the internal face such that the recliner heart is disposed adjacent the external face.

* * * * *